(12) United States Patent
Desai et al.

(10) Patent No.: US 10,656,939 B2
(45) Date of Patent: *May 19, 2020

(54) MODELING LIFETIME OF HYBRID SOFTWARE APPLICATION USING APPLICATION MANIFEST

(71) Applicant: Microsoft Technology Licensing, LLC, Redmond, WA (US)

(72) Inventors: Aditya Makarand Desai, Issaquah, WA (US); Srivatsan Kidambi, Redmond, WA (US); Shefy Manayil Kareem, Lynnwood, WA (US); Anand Rengasamy, Bothell, WA (US); Prashant Kumar, Kirkland, WA (US); Alok Jain, Redmond, WA (US); Bryan Dickens, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/391,086

(22) Filed: Apr. 22, 2019

(65) Prior Publication Data

US 2019/0369986 A1 Dec. 5, 2019

Related U.S. Application Data

(63) Continuation of application No. 15/993,293, filed on May 30, 2018, now Pat. No. 10,268,477.

(51) Int. Cl.
*G06F 9/44* (2018.01)
*G06F 8/73* (2018.01)
*G06F 8/65* (2018.01)
*G06F 8/60* (2018.01)
*G06F 8/61* (2018.01)

(52) U.S. Cl.
CPC ............... *G06F 8/73* (2013.01); *G06F 8/60* (2013.01); *G06F 8/62* (2013.01); *G06F 8/65* (2013.01)

(58) Field of Classification Search
CPC ..... G06F 8/34; G06F 8/10; G06F 8/20; G06F 8/24; G06F 8/36; G06F 8/30; G06Q 10/06
USPC .................................................. 717/104–115
See application file for complete search history.

(56) References Cited

U.S. PATENT DOCUMENTS 10,268,477 B1 * 4/2019 Desai ...................... G06F 8/65

* cited by examiner

*Primary Examiner* — Chuck O Kendall
(74) *Attorney, Agent, or Firm* — Wade IP Law LLC

(57) ABSTRACT

Techniques are described herein that are capable of modeling a lifetime of a hybrid software application using an application manifest. For instance, workflows and input-output information may be received (e.g., from an independent software vendor). The workflows are configured to implement respective heterogeneous software products that are included in a hybrid software application. The input-output information specifies inputs of the heterogeneous software products and a mapping between output(s) of first heterogeneous software product(s) and input(s) of second heterogeneous software product(s). Operations that are to be performed to execute the workflows are determined based at least in part on the inputs and the mapping. A lifetime of the hybrid software application is modeled by generating an application manifest that defines the lifetime based at least in part on the operations.

20 Claims, 7 Drawing Sheets

MODELING LIFETIME OF HYBRID SOFTWARE APPLICATION USING APPLICATION MANIFEST

CROSS-REFERENCE TO RELATED APPLICATION(S)

This application is a continuation of U.S. patent application Ser. No. 15/993,293 filed May 30, 2018 and entitled "Modeling Lifetime of Hybrid Software Application Using Application Manifest," the entirety of which is incorporated by reference herein.

BACKGROUND

Cloud services are becoming increasingly popular with users of computing devices. For instance, independent software vendors may upload solutions to servers to enable the servers to serve the solutions as cloud services to users via a network, such as the Internet. For example, the cloud services may enable the users to access shared resources that are stored on or are otherwise accessible to the servers via the network. Cloud services are often based on multiple software products having different process workflows. For instance, each process workflow may include its own processes (e.g., setup, update, upgrade, and cleanup), which typically are different from the processes of the other process workflows. Although some independent software vendors have automated a single process of a process workflow, overall orchestration of the workflows typically is handled manually offline. Such manual workflow orchestration may involve each independent software vendor defining its own workflow processes and performing orchestration of the workflow processes manually.

SUMMARY

Various approaches are described herein for, among other things, modeling a lifetime of a hybrid software application (e.g., a predefined hybrid software application) using an application manifest. An application manifest is a file (e.g., a JavaScript Object Notation (JSON) file) that includes metadata regarding files of an application (e.g., a software application). For example, the application manifest may describe a name, version number, trust information, privileges, license, and/or files of the application. In another example, the application manifest may describe dependencies among the components of the application. In one example implementation, the application manifest is an XML file that accompanies executable files of the application. In another example implementation, the application manifest is integrated into one or more of the executable files.

A hybrid software application is a software application that includes heterogeneous software products. Heterogeneous software products are software products that are not the same. The heterogeneous software products may be created by a common software provider or by different software providers. For example, Dynamics 365® and Office 365® are different software products that are developed and distributed by a common software provider—Microsoft Corporation. In another example, Salesforce®, Twitter®, and Dropbox® are different software products that are developed and distributed by different software providers—Salesforce.com, Inc.; Twitter, Inc.; and Dropbox, Inc., respectively.

In an example approach, workflows and input-output information are received (e.g., from an independent software vendor). The workflows are configured to implement respective heterogeneous software products that are included in a hybrid software application. The input-output information specifies inputs of the heterogeneous software products and further specifies a mapping between at least one output of at least one first heterogeneous software product and at least one input of at least one second heterogeneous software product. Operations that are to be performed to execute the workflows are determined based at least in part on the inputs and the mapping. A lifetime of the hybrid software application is modeled by generating an application manifest that defines at least a provisioning process and a deprovisioning process of the hybrid software application based at least in part on the operations to reduce an amount of resources that is consumed to configure the hybrid software application for execution. The defined provisioning process includes a first subset of the operations that is configured to deploy the hybrid software application. For instance, the provisioning process may be a user-independent process. The defined deprovisioning process includes a second subset of the operations that is configured to terminate access of a user to the hybrid software application.

In one aspect of this approach, the lifetime of the hybrid software application may be managed based on (e.g., based at least in part on) the application manifest in response to receipt of a request from the user to access the hybrid software application. In another aspect of this approach, the application manifest may be validated based on a determination that execution of the workflows provides a result that is specified by an independent software vendor from which the workflows are received.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
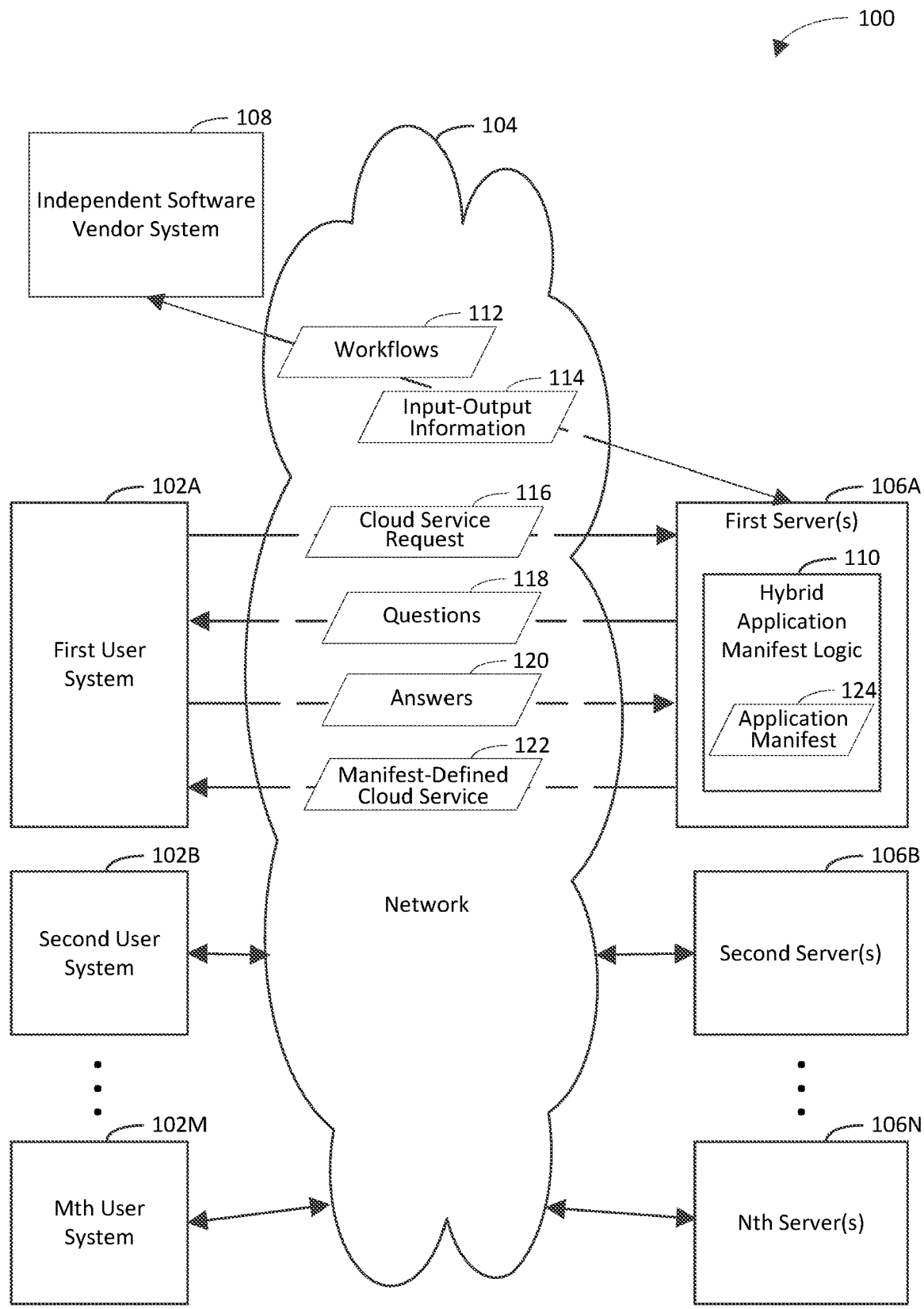
FIG. 1 is a block diagram of an example lifetime modeling system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of modeling a lifetime of a hybrid software application (e.g., a predefined hybrid software application) using an application manifest. An application manifest is a file (e.g., a JavaScript Object Notation (JSON) file) that includes metadata regarding files of an application (e.g., a software application). For example, the application manifest may describe a name, version number, trust information, privileges, license, and/or files of the application. In another example, the application manifest may describe dependencies among the components of the application. In one example implementation, the application manifest is an XML file that accompanies executable files of the application. In another example implementation, the application manifest is integrated into one or more of the executable files.

A hybrid software application is a software application that includes heterogeneous software products. Heterogeneous software products are software products that are not the same. The heterogeneous software products may be created by a common software provider or by different software providers. For example, Dynamics 365® and Office 365® are different software products that are developed and distributed by a common software provider—Microsoft Corporation. In another example, Salesforce®, Twitter®, and Dropbox® are different software products that are developed and distributed by different software providers—Salesforce.com, Inc.; Twitter, Inc.; and Dropbox, Inc., respectively.

Example techniques described herein have a variety of benefits as compared to conventional techniques for implementing a hybrid software application. For instance, the example techniques may be capable of modeling (e.g., automatically modeling) a lifetime of a hybrid software application using an application manifest. For example, such techniques may be capable of using the application manifest to aggregate workflows of respective heterogeneous software products that traditionally exist in silos. By aggregating the workflows, the example techniques may improve performance of a computing system that implements the workflows. For example, aggregating the workflows may reduce a number of times memory of the computing system is accessed to implement the workflows. In another example, storing the aggregated workflows may consume less memory than storing the siloed workflows would consume. In yet another example, implementing the aggregated workflows may consume fewer processing cycles of the computing device than implementation of the siloed workflows would consume. For instance, aggregating the workflows may reduce redundancies associates with the workflows, which may reduce a number of memory accesses, an amount of memory consumed, and/or a number of processing cycles utilized to implement the workflows. The example techniques may be capable of managing (e.g., automatically managing) a lifetime of a hybrid software application based on (e.g., based at least in part on) an application manifest. The example techniques may be capable of validating (e.g., automatically validating) an application manifest that defines a lifetime of a hybrid software application. The example techniques may make the hybrid software application available for public consumption based on certification of the application manifest.

By modeling a lifetime of a hybrid software application using an application manifest, managing the lifetime of the hybrid software application based on the application manifest, and/or validating the application manifest, the example techniques may reduce an amount of time and/or resources (e.g., memory, processor cycles, network bandwidth) that is consumed to configure the hybrid software application for execution and/or execute the hybrid software application. In one example implementation, the example techniques may improve performance of a computing system by automating a variety of operations associated with configuring the hybrid software application for execution and/or executing the hybrid software application that are traditionally performed manually (e.g., by an independent software vendor). For example, in accordance with this implementation, the performance of the computing system may be improved by automating various processes of each workflow of the hybrid software application, automatically interconnecting the various workflows, and/or automatically orchestrating the workflows (e.g., using input from users of the hybrid software application). In accordance with this implementation, by providing such automation, the example techniques may reduce a number of times that memory of the computing system is accessed (e.g., by an independent software vendor), an amount of memory that is consumed, and/or a number of processor cycles consumed to configure the hybrid software application for execution and/or execute the hybrid software application. The example techniques may increase efficiency of a computing system that is used to configure the hybrid software application for execution and/or execute the hybrid software application. The example techniques may increase user efficiency (e.g., efficiency of an independent software vendor that provides workflows that are configured to implement respective heterogeneous software products of the hybrid software application). For example, by automating orchestration of the workflows and the processes therein, the example techniques may reduce a number of steps that are performed by an independent software vendor, an amount of effort that the independent software vendor expends, and/or an amount of time that the independent software vendor takes to orchestrate the workflows and the processes therein.

FIG. 1 is a block diagram of an example lifetime modeling system 100 in accordance with an embodiment. Generally speaking, lifetime modeling system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, lifetime modeling system 100 models a lifetime of a hybrid software application using an application manifest 124. Detail regarding techniques for modeling a lifetime of a hybrid software application using an application manifest is provided in the following discussion.

As shown in FIG. 1, lifetime modeling system 100 includes a plurality of user systems 102A-102M, a network 104, a plurality of servers 106A-106N, and an independent software vendor system 108. Communication among user systems 102A-102M, servers 106A-106N, and independent software vendor system 108 is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 106A-106N, so that user systems 102A-102M may access information that is available via the domains. Such domains may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user systems 102A-102M may communicate with any one or more servers 106A-106N.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of lifetime modeling system 100.

One example type of a computer program that may be executed by one or more of the servers 106A-106N is a cloud computing program. A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network. The cloud computing program may provide infrastructure as a service (IaaS), platform as a service (PaaS), and/or software as a service (SaaS) services to the users. Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

First server(s) 106A are shown to include hybrid application manifest logic 110 for illustrative purposes. Hybrid application manifest logic 110 is configured to model a lifetime of a hybrid software application using the application manifest 124. Hybrid application manifest logic 110 receives workflows 112 and input-output information 114 from independent software vendor system 108. The workflows 112 are configured to implement respective heterogeneous software products of the hybrid software application. The input-output information 114 specifies inputs of the heterogeneous software products. The input-output information 114 also indicates relationships between the workflows 112. For instance, the input-output information 114 may specify which outputs of the heterogeneous software products serve as inputs of the heterogeneous software products. For instance, an output of a first heterogeneous software product may serve as an input to a second heterogeneous software product, an output of the second heterogeneous software product may serve as an input to a third heterogeneous software product, and so on. Any one or more outputs of a heterogeneous software product may serve as input(s) to any one or more other heterogeneous software products. Accordingly, the input-output information 114 may specify a mapping between output(s) of first heterogeneous software product(s) and input(s) of second heterogeneous software product(s).

Hybrid application manifest logic 110 analyzes the workflows 112 and relationships between the workflows 112, as indicated by the input-output information 114, to generate the application manifest 124, which models the lifetime of the hybrid software application. For instance, each of the workflows may define multiple types of processes that are to be performed to implement the respective heterogeneous software product. Hybrid application manifest logic 110 may aggregate the definitions for each type of process from the various workflows to provide an aggregated process definition for that type. Hybrid application manifest logic 110 may incorporate the aggregated process definition for each type of process into the application manifest 124 to model the lifetime of the hybrid software application.

In an example implementation, each of the workflows 112 includes a provision definition, a deprovision definition, an assignment definition, an update definition, and/or an upgrade definition. Each provision definition defines a provision process that is configured to deploy the respective heterogeneous software product. For instance, any one or more of the provision processes may be configured to provide a database, provide data (e.g., trial data) in the database (e.g., depending on type of user), deploy a website, and/or select and deploy an application (e.g., on another application, such as a customer relationship management (CRM) application). Each provision process may be a user-independent process, through the scope of the example embodiments is not limited in this respect. Each deprovision definition defines a deprovision process that is configured to terminate access of user(s) to the respective heterogeneous software product. Each assignment definition defines an assign process that is configured to assign user(s) to the respective heterogeneous software product. Assignment of the user(s) to a heterogeneous software product enables the user(s) to utilize functionality of the heterogeneous software product. Each update definition defines an update process that is configured to change a deployed version of the respective heterogeneous software product from a first version to a second version. For instance, the first version may have first metadata, and the second version may have second metadata that is different from the first metadata. Each upgrade definition defines an upgrade process that is configured to change a deployed version of the respective heterogeneous software product to include one or more additional capabilities.

In accordance with this implementation, hybrid application manifest logic 110 aggregates the provision definitions from the workflows 112 to provide an aggregated provision definition. The aggregated provision definition defines an aggregated provision process that includes the provision processes defined by the provision definitions in the workflows 112. Hybrid application manifest logic 110 aggregates the deprovision definitions from the workflows 112 to provide an aggregated deprovision definition. The aggregated deprovision definition defines an aggregated deprovision process that includes the deprovision processes defined by the deprovision definitions in the workflows 112. Hybrid application manifest logic 110 aggregates the assignment definitions from the workflows 112 to provide an aggregated assignment definition. The aggregated assignment definition defines an aggregated assignment process that includes the assignment processes defined by the assignment definitions in the workflows 112. Hybrid application manifest logic 110 aggregates the update definitions from the workflows 112 to provide an aggregated update definition. The aggregated update definition defines an aggregated update process that includes the update processes defined by the update definitions in the workflows 112. Hybrid application manifest logic 110 aggregates the upgrade definitions from the workflows 112 to provide an aggregated upgrade definition. The aggregated upgrade definition defines an aggregated upgrade process that includes the upgrade processes defined by the upgrade definitions in the workflows 112.

In further accordance with this implementation, hybrid application manifest logic 110 generates the application manifest 124 to include the aggregated provision definition, the aggregated deprovision definition, the aggregated assignment definition, the aggregated update definition, and the aggregated upgrade definition to model the lifetime of the hybrid software application. Accordingly, it can be said that hybrid application manifest logic 110 converts the workflows 112 (e.g., the definitions therein) into the application manifest 124.

Hybrid application manifest logic 110 may manage a lifetime of the hybrid software application based on the application manifest 124. For instance, hybrid application manifest logic 110 may perform the aggregated processes defined by the aggregated process definitions in the application manifest 124 to manage the lifetime of the hybrid software application. Accordingly, hybrid application manifest logic 110 may perform the aggregated provision process defined by the aggregated provision definition, the aggregated deprovision process defined by the aggregated deprovision definition, the aggregated assignment process defined by the aggregated assignment definition, the aggregated update process defined by the aggregated update definition, and/or the aggregated upgrade process defined by the aggregated upgrade definition to manage the lifetime of the hybrid software application.

In an example implementation, hybrid application manifest 110 receives a cloud service request 116 from first user system 102A. The cloud service request 116 requests access to the hybrid software application. In accordance with this implementation, hybrid application manifest logic 110 provides questions to first user system 102A in response to receipt of the cloud service request. For instance, the receipt of the cloud service request 116 may trigger hybrid application manifest logic 110 to provide the questions 118. Hybrid application manifest logic 110 may obtain the questions 118 from the input-output information 114, which is received from independent software vendor system 108, though the example embodiments are not limited in this respect. In further accordance with this implementation, hybrid application manifest logic 110 receives answers 120 from first user system 102A in response to the questions 118. In further accordance with this implementation, hybrid application manifest logic 110 executes the workflows 112, which are received from independent software vendor system 108, based on the answers 120 to provide a manifest-defined cloud service 122 of the hybrid software application to first user system 102A. For instance, hybrid application manifest logic 110 may perform a first set of operations to provide a first configuration of the manifest-defined cloud service 122 to first user device 102A if a first set of answers is received from first user system 102A; hybrid application manifest logic 110 may perform a second set of operations to provide a second configuration of the manifest-defined cloud service 122, which is different from the first configuration, to first user device 102A if a second set of answers is received from first user system 102A, and so on.

Hybrid application manifest logic 110 may validate the application manifest 124. For instance, hybrid application manifest logic 110 may receive validation criteria from independent software vendor system 108. The validation criteria may indicate results that are expected (i.e., expected results) when the workflows 112 are performed. Hybrid application manifest logic 110 may perform the workflows 112 to provide achieved results. Hybrid application manifest logic 110 may compare the achieved results and the expected results to determine whether the achieved results and the expected results match. For instance, a match may indicate that the achieved results and the expected results are the same or that a difference between the achieved results and the expected results is within a matching threshold.

In an example implementation, performance of the aggregated processes that are defined by the application manifest 124 results in respective success indicators. Each success indicator indicates whether the respective aggregated process executed successfully. Each success indicator may be based on success indicators generated by the respective processes that are included in the respective aggregated process. In one aspect of this implementation, hybrid application manifest logic 110 may be configured to validate the application manifest 124 based on the success indicators indicating that the respective aggregated processes are executed successfully. In another aspect of this implementation, hybrid application manifest logic 110 may be configured to not validate the application manifest 124 based on the success indicators indicating that one or more (e.g., at least a specified threshold number) of the respective aggregated processes are not executed successfully. In accordance with this aspect, hybrid application manifest logic 110 may be configured to validate the application manifest 124 based on the success indicators indicating that at least a designated threshold number of the respective aggregated processes are executed successfully. The specified threshold number and the designated threshold number may be the same or different.

It will be recognized that hybrid application manifest logic 110 may be (or may be included in) a cloud computing program, though the scope of the example embodiments is not limited in this respect. Hybrid application manifest logic 110 is shown to be incorporated in first server(s) 106A for illustrative purposes and is not intended to be limiting. It will be recognized that hybrid application manifest logic 110 (or any portion(s) thereof) may be incorporated in any one or more of servers 106A-106N.

Hybrid application manifest logic 110 may be implemented in various ways to iteratively update a collaboration site or template, including being implemented in hardware, software, firmware, or any combination thereof. For example, hybrid application manifest logic 110 may be implemented as computer program code configured to be executed in one or more processors. In another example, hybrid application manifest logic 110 may be implemented as hardware logic/electrical circuitry. For instance, hybrid application manifest logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Independent software vendor system 108 is a processing system that is capable of communicating with servers 106A-106N. Independent software vendor system 108 is configured to perform operations to facilitate modeling the lifetime of the hybrid software application using the application manifest 124 in response to instructions that are received from an independent software vendor with which the hybrid software application is associated. For instance, independent software vendor system 108 may provide the workflows 112 and the input-output information 114 to first server(s) 106A based on instructions that are received from the independent software vendor.

Figure 2:
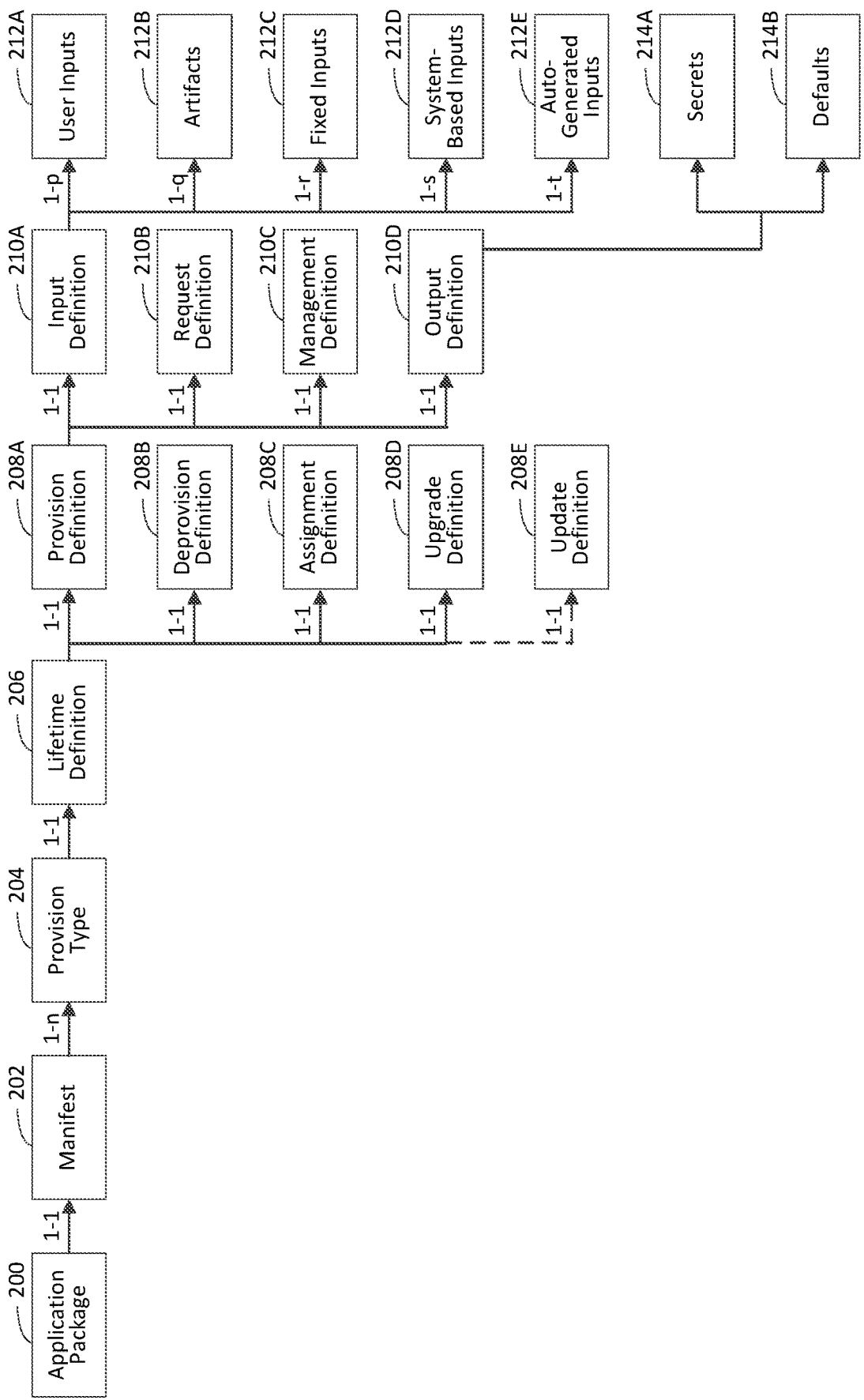
FIG. 2 is a block diagram of an example application package in accordance with an embodiment.

FIG. 2 is a block diagram of an example application package 200 in accordance with an embodiment. For instance, hybrid application manifest logic 110 may generate the application package 200 based on the workflows 112 and the input-output information 114 that are received from independent software vendor system 108, as described above with reference to FIG. 1. As shown in FIG. 2, the application package 200 includes a manifest 202 that defines one or more lifetimes of a hybrid software application. For instance, manifest 202 may be an example implementation of application manifest 124. The lifetime(s) of the hybrid software application that are defined by the manifest 202 correspond to respective configuration(s) of the hybrid software application. These configurations are provisioned in different ways. Accordingly, the manifest 202 is shown in FIG. 2 to be associated with n provision types 204, where n is a positive whole number, and each provision type corresponds to a respective lifetime definition 206. The provision types 204 correspond to the respective configurations of the hybrid software application. The lifetime definition 206 defines the lifetime of the hybrid software application.

Examples of a provision type include but are not limited to a test drive provision type, a trial provision type, and a production provision type. The test drive provision type is characterized by limiting execution of the hybrid software application to a predetermined environment and a predetermined period of time (e.g., one hour, two weeks, or one month). The trial provision type is characterized by enabling a user of the hybrid software application to select a limited environment in which to execute the hybrid software application. The trial provision type does not limit execution of the hybrid software application to a predetermined period of time. The production provision type is characterized by not limiting execution of the hybrid software application to a predetermined environment and not limiting the execution of the hybrid software application to a predetermined period of time.

Each lifetime definition 206 includes a plurality of process definitions 208A-208E, more particularly a provision definition 208A, a deprovision definition 208B, an assignment definition 208C, an upgrade definition 208D, and an update definition 208E. Each of the process definitions 208A-208E defines a respective process that is to be performed based on workflows (e.g., workflows 112) that are configured to implement respective heterogeneous software products that are included in the hybrid software application. For example, the provision definition 208A defines a provision process that is based on (e.g., as an aggregate of) the provision processes defined in the respective workflows. The deprovision definition 208B defines a deprovision process that is based on the deprovision processes defined in the respective workflows. The assignment definition 208C defines an assignment process that is based on the assignment processes defined in the respective workflows. The upgrade definition 208D defines an upgrade process that is based on the upgrade processes defined in the respective workflows. The update definition 208E defines an update process that is based on the update processes defined in the respective workflows. The provision definition 208A, the deprovision definition 208B, the assignment definition 208C, the upgrade definition 208D, and the update definition 208E are provided for illustrative purposes and are not intended to be limiting. It will be recognized that each lifetime definition 206 need not necessarily include each of the process definitions 208A-208E. Moreover, each lifetime definition 206 may include one or more process definitions in addition to or in lieu of the process definitions 208A-208E.

Each of the process definitions 208A-208E includes a plurality of step definitions 210A-210D, more particularly an input definition 210A, a request definition 210B, a management definition 210C, and an output definition 210D. The input definition 210A describes (e.g., defines) user inputs that are to be received (e.g., collected) for the process defined by the respective process definition. The request definition 210B describes a request that is to serve as a trigger for initiating management of the process. The management definition 210C describes steps that are to be performed to manage the process. The output definition 210D describes metadata markdown(s) that are to be used to render the process post-execution. For instance, output of the management definition 210C may declare the metadata markdown that is to be used.

Each request definition 210B may have any of a variety of sources. Moreover, each request definition 210B may have any suitable number of each source type. Examples of a source type include but are not limited to user inputs 212A, artifacts 212B, fixed inputs 212C, system-based inputs 212D, and auto-generated inputs 212E. User inputs 212A are inputs that are received from an end-user of the hybrid software application. Artifacts 212B are inputs that are files in the application package 200 that are to be passed as a uniform resource identifier (URI) to the management process, which is defined by management definition 210C. For instance, the URI may include a uniform resource locator (URL) or a uniform resource name (URN). Fixed inputs 212C are non-variable inputs. For instance, the fixed inputs 212C may have values that are guaranteed by the independent software vendor. System-based inputs 212D are inputs that are generated by a computing system on which the hybrid software application executes. Auto-generated inputs 212E are unique values. For instance, the auto-generated inputs 212E may be inputs that are randomly generated or semi-randomly generated. The request definition 210B is shown in to have p user inputs 212A, q artifacts 212B, r fixed inputs 212C, s system-based inputs 212D, and t auto-generated inputs 212E, where each of p, q, r, s, and t is a positive whole number.

Each output definition 210D describes outputs that may be classified as secrets 214A or defaults 214B. Secrets 214A and defaults 214B are passed by the independent software vendor (e.g., to hybrid application manifest logic 110). The secrets 214A are fixed values that are persisted in a designated container (e.g., by hybrid application manifest logic 110) for secure storage. Defaults 214B are fixed values that are persisted with the manifest 200.

Figure 3:
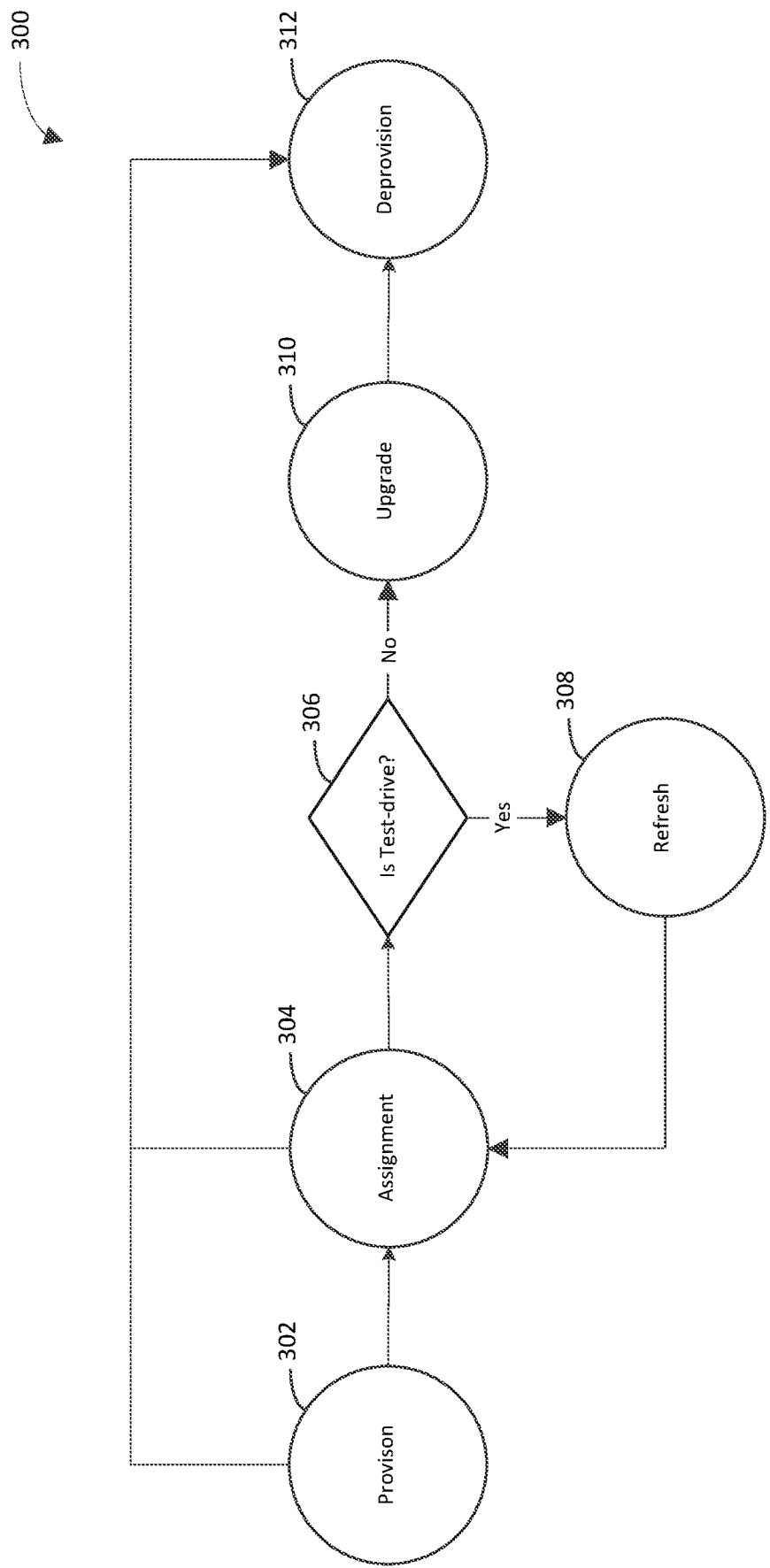
FIG. 3 is a state transition diagram of an example lifetime definition in accordance with an embodiment.

FIG. 3 is a state transition diagram of an example lifetime definition 300 in accordance with an embodiment. For instance, the lifetime definition 300 may be an example implementation of the lifetime definition 206 described above with reference to FIG. 2. As shown in FIG. 3, the lifetime definition 300 includes a provision definition 302, an assignment definition 304, a decision block 306, a refresh definition 308, an upgrade definition 310, and a deprovision definition 312. In the embodiment of FIG. 3, the provision definition 302 describes provisioning of the hybrid software application at the latest available version. The assignment definition 304 describes provisioning of the hybrid software application at the version at which the hybrid software application was provisioned (or the future version to which the hybrid software application will be upgraded). The decision block 306 determines whether the provision type of the hybrid software application is a test drive provision type. If so, the refresh definition 308 is implemented. If not, the upgrade definition 310 is implemented. The refresh definition 308 refreshes the state of the deployment of the hybrid software application after expiration of the assignment that is described by the assignment definition 304. Refresh for an assigned instance executes at the version at which the instance was assigned. In the embodiment of FIG. 3, the refresh is performed only for the test drive provision type. The upgrade definition 310 defines upgrades to the hybrid software application from a specified version to the same version (i.e., the specified version). For instance, the version may be upgraded from basic SKU to a standard SKU. The deprovision definition 312 describes deprovisioning of the hybrid software application. It should be noted that the refresh definition 308 is a type of update definition. The update definition in this embodiment defines updates of the hybrid software application from a specified version to another version.

In an example implementation, the lifetime definition 300 is configured such that the process definitions 302, 304, 308, 310, and 312 are immutable. For instance, each change to a definition may increment the manifest version by one (e.g., while persisting the original document). In another example implementation, all assignment, refresh, and deprovision operations are executed using the same version of the lifetime definition 300 as the corresponding provision operation for the acquisition. In yet another example implementation, an immutable property for the lifetime definition 300 is relaxed if and only if the immutable property involves a hotfix to the deprovision definition 312 that is preventing deprovisioning from occurring.

Figure 4:
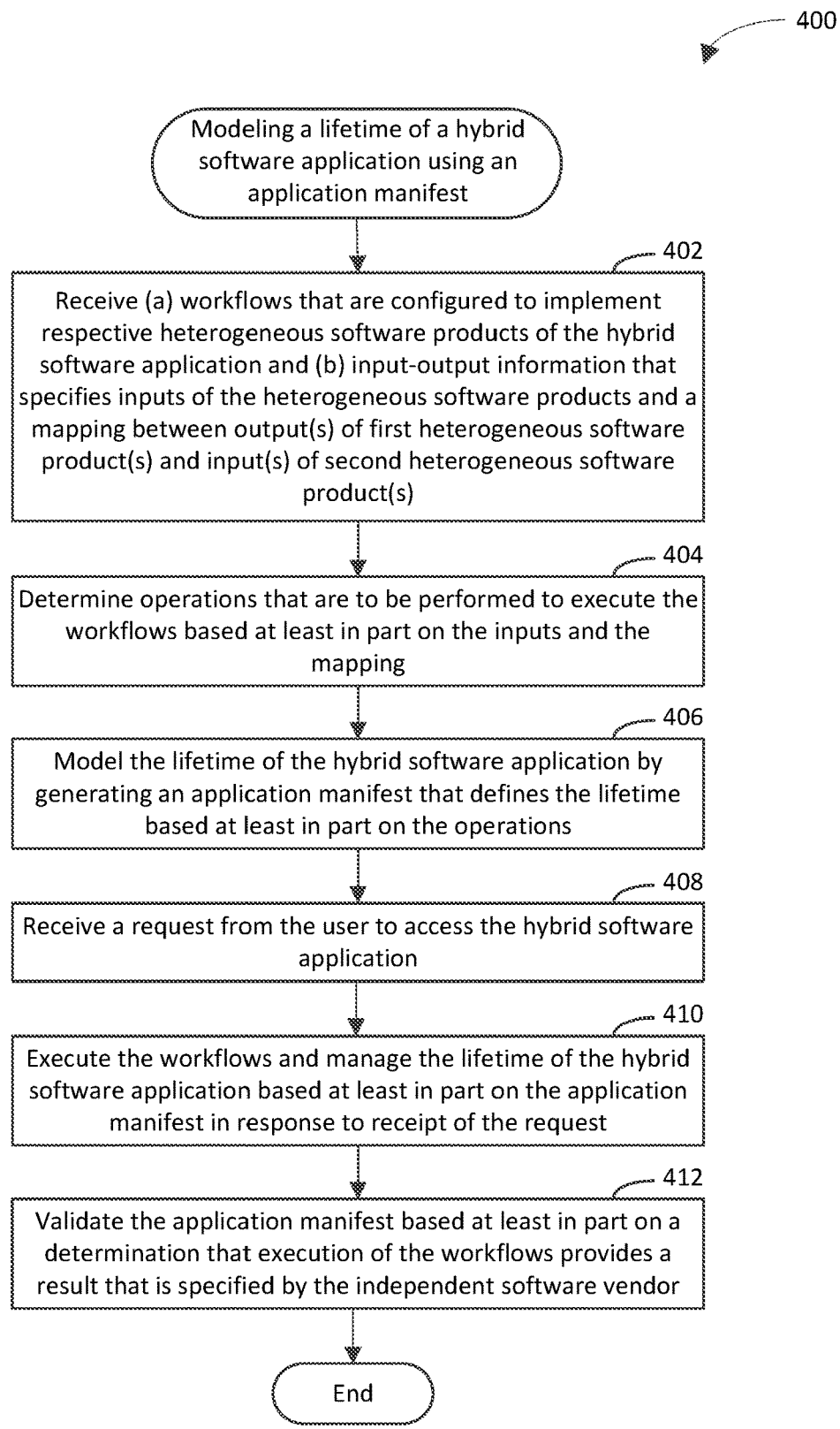
FIG. 4 depicts a flowchart of an example method for modeling a lifetime of a hybrid software application using an application manifest in accordance with an embodiment.
Figure 5:
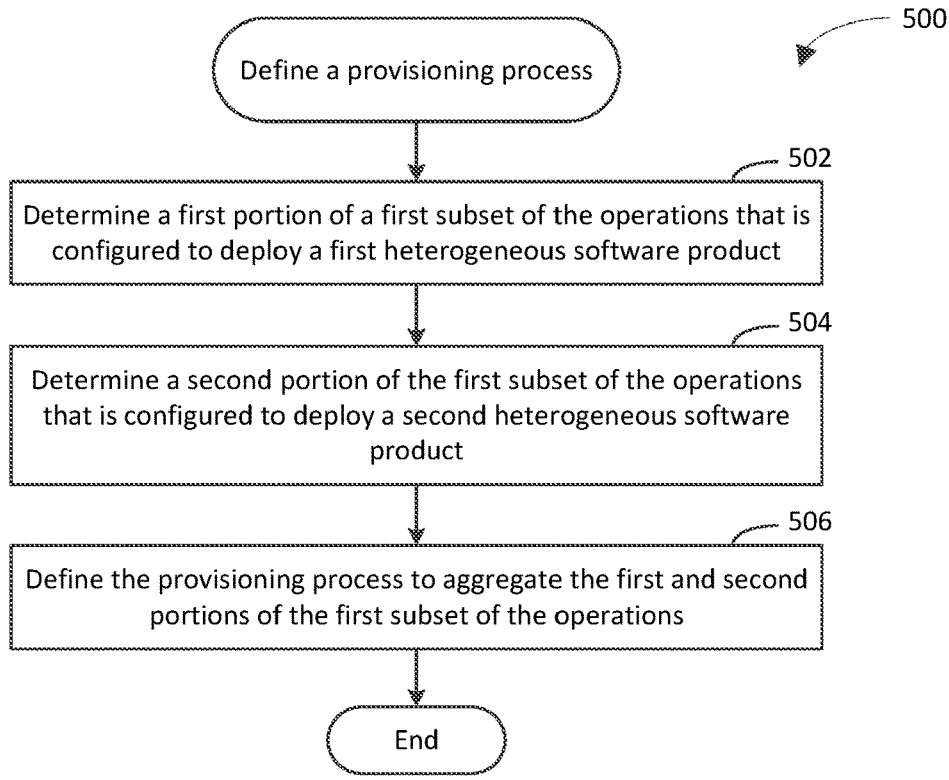
FIG. 5 depicts a flowchart of an example method for defining a provisioning process in accordance with an embodiment.
Figure 6:
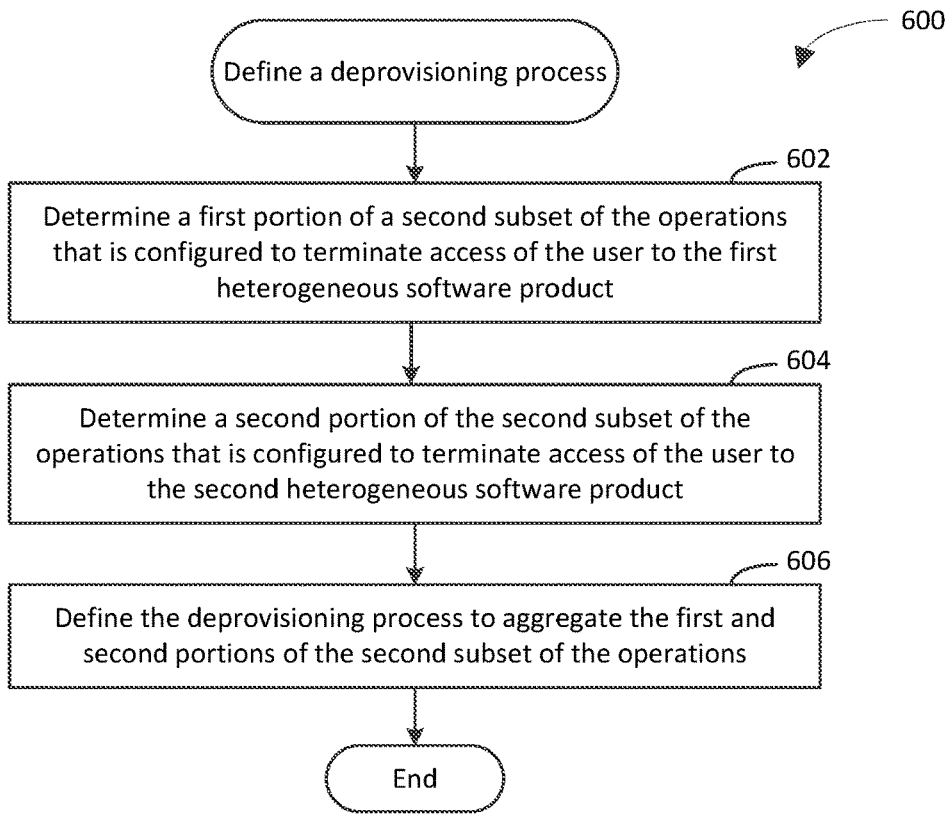
FIG. 6 depicts a flowchart of an example method for defining a deprovisioning process in accordance with an embodiment.
Figure 7:
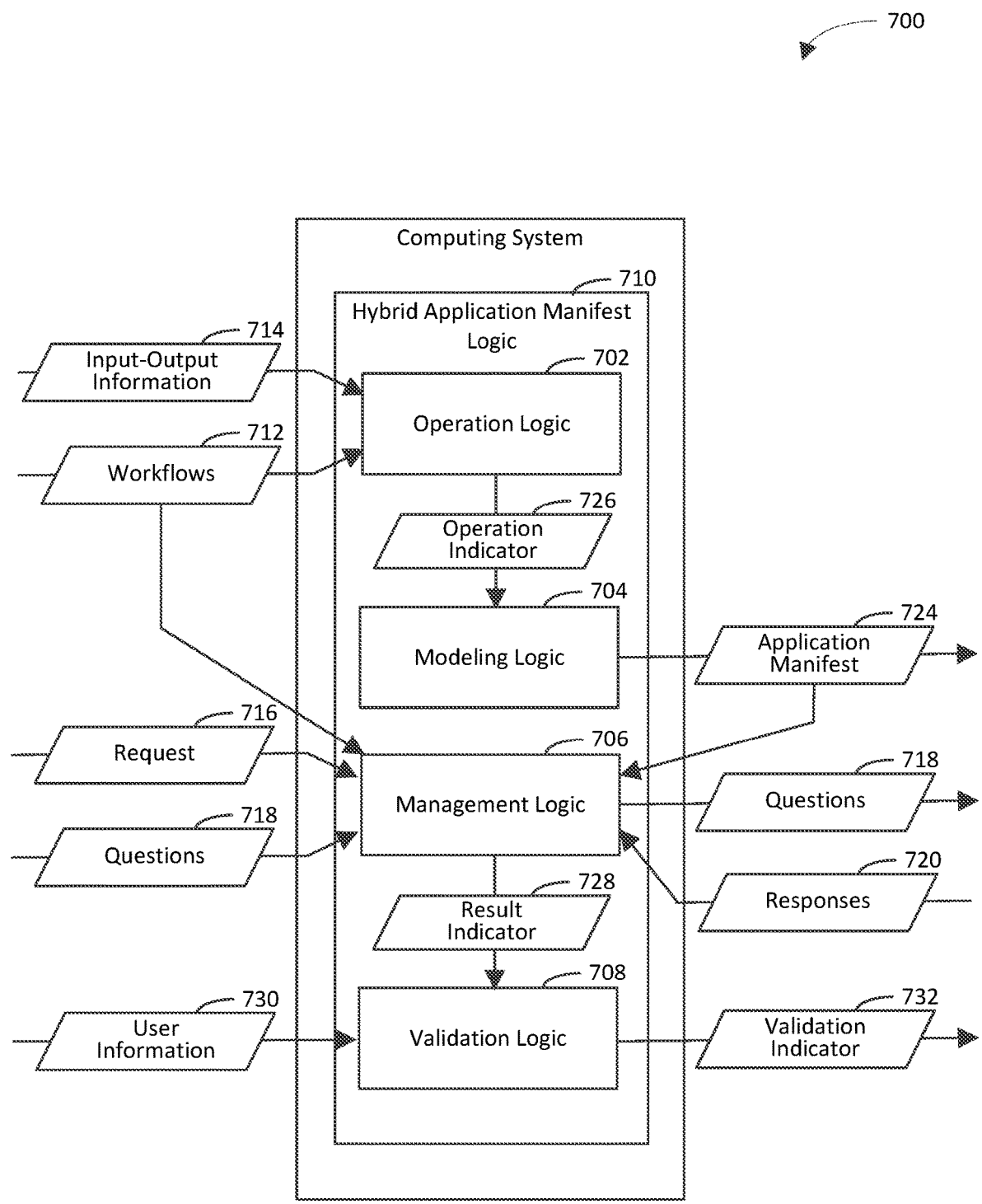
FIG. 7 is a block diagram of an example computing system shown in FIG. 1 in accordance with an embodiment.

FIG. 4 depicts a flowchart 400 of an example method for modeling a lifetime of a hybrid software application using an application manifest in accordance with an embodiment. The hybrid software application may be a region-specific application and/or an industry-specific application, though the scope of the example embodiments is not limited in this respect. A region-specific application is an application that is configured for use in a designated geographic region (e.g., country or continent). An industry-specific application is an application that is configured for use in a designated industry. Examples of an industry include but are not limited to automotive, fashion, finance, healthcare, hospitality, real estate, telecommunications, and transportation. FIG. 5 depicts a flowchart 500 of an example method for defining a provisioning process in accordance with an embodiment. FIG. 6 depicts a flowchart 600 of an example method for defining a deprovisioning process in accordance with an embodiment. Flowcharts 400, 500, and 600 may be performed by any one or more of server(s) 106A-106N shown in FIG. 1, for example. For illustrative purposes, flowcharts 400, 500, and 600 are described with respect to a computing system 700 shown in FIG. 7. As shown in FIG. 7, computing system 700 includes hybrid application manifest logic 710. Hybrid application manifest logic 710 includes operation logic 702, modeling logic 704, management logic 706, and validation logic 708. Further structural and operational embodiments will be apparent to persons skilled in the relevant art(s) based on the discussion regarding flowcharts 400, 500, and 600.

As shown in FIG. 4, the method of flowchart 400 begins at step 402. In step 402, workflows and input-output information are received (e.g., from an independent software vendor). The workflows are configured to implement the respective heterogeneous software products. For example, the workflows may call into application programming interfaces (APIs) to implement the heterogeneous software products. In accordance with this example, the workflows may implement the heterogeneous software products by causing the APIs to call into the heterogeneous software products. The input-output information specifies inputs of the heterogeneous software products and further specifies a mapping between at least one output of at least one first heterogeneous software product and at least one input of at least one second heterogeneous software product. In an example implementation, operation logic 702 receives workflows 712 and input-output information 714. In accordance with this implementation, workflows 712 are configured to implement the respective heterogeneous software products. In further accordance with this implementation, the input-output information 714 specifies the inputs and the mapping.

At step 404, operations that are to be performed to execute the workflows are determined based at least in part on the inputs and the mapping. In an example implementation, operation logic 702 determines the operations that are to be performed to execute the workflows 712 based at least in part on the inputs and the mapping, which are specified by the input-output information 714. In accordance with this implementation, operation logic 702 may generate an operation indicator 726 to indicate (e.g., specify) the operations that are to be performed.

At step 406, the lifetime of the hybrid software application is modeled by generating an application manifest that defines the lifetime based at least in part on the operations. For instance, the lifetime may be modeled to reduce an amount of resources that is consumed to configure the hybrid software application for execution. In a provisioning-deprovisioning example, the lifetime includes at least a provisioning process and a deprovisioning process. In accordance with this example, modeling the lifetime at step 406 may include defining the provisioning process to include a first subset of the operations that is configured to deploy the hybrid software application. For instance, the provisioning process may be defined to include the first subset of the operations based on the first subset of the operations not requiring input from a user of the hybrid software application. In further accordance with this example, modeling the lifetime at step 406 may further include defining the deprovisioning process to include a second subset of the operations that is configured to terminate access of the user to the hybrid software application. In an example implementation, modeling logic 704 models the lifetime of the hybrid software application by generating an application manifest 724 that defines the lifetime based at least in part on the operations. In accordance with this implementation, modeling logic 704 may model the lifetime in response to receipt of the operation indicator 726. For instance, modeling logic 704 may model the lifetime based at least in part on the operation indicator 726 indicating the operations.

In an aspect of the provisioning-deprovisioning example mentioned above, modeling the lifetime at step 406 may further include defining a predetermined fixed amount of time that is to pass between a first time instance at which the provisioning process is initiated and a second time instance at which the deprovisioning process is initiated.

In another aspect of the provisioning-deprovisioning example, the lifetime may further include an assign process.

In accordance with this aspect, modeling the lifetime at step 406 may further include defining the assign process to include a third subset of the operations that is configured to assign the user to the hybrid software application.

In yet another aspect of the provisioning-deprovisioning example, the lifetime may further include an update process. In accordance with this aspect, modeling the lifetime at step 406 may further include defining the update process to include a third subset of the operations that is configured to change a deployed version of the hybrid software application from a first version having first metadata to a second version having second metadata that is different from the first metadata.

In still another aspect of the provisioning-deprovisioning example, the lifetime may further include an upgrade process. In accordance with this aspect, modeling the lifetime at step 406 may further include defining the upgrade process to include a third subset of the operations that is configured to change a deployed version of the hybrid software application to include one or more additional capabilities.

In an example embodiment, modeling the lifetime of the hybrid software application at step 406 includes modeling multiple versions of the lifetime that correspond to respective provision types. In accordance with this embodiment, the provision types may include a test drive provision type, a trial provision type, and/or a production provision type. The test drive provision type is characterized by limiting execution of the hybrid software application to a predetermined environment and a predetermined period of time. The trial provision type is characterized by enabling the user of the hybrid software application to select a limited environment in which to execute the hybrid software application and further by not limiting execution of the hybrid software application to a predetermined period of time. A limited environment is an environment in which a number of users who are granted access to the hybrid software application is less than a number of users who are to be granted access to the hybrid software application in a production environment. For instance, the limited environment may be defined by a department or a division of an organization or a limited number of users in the organization, rather than the entire organization. The production provision type is characterized by not limiting execution of the hybrid software application to a predetermined environment and further by not limiting the execution of the hybrid software application to a predetermined period of time.

At step 408, a request to access the hybrid software application is received from the user. In an example implementation, management logic 706 receives a request 716 form the user to access the hybrid software application.

At step 410, the workflows are executed and the lifetime of the hybrid software application is managed based at least in part on the application manifest in response to receipt of the request. In an example implementation, management logic 706 executes the workflows 712 and manages the lifetime of the hybrid software application based at least in part on the application manifest 724 in response to receipt of the request 716. In an aspect, management logic 706 may generate a result indicator 728 to indicate a result that is provided by executing the workflows 712. In accordance with this aspect, management logic 706 may execute the workflows 712 in a test environment or a production environment to provide the result. For instance, management logic 706 may execute the workflows 712 at step 410 or at a step other than 410 to provide the result.

In an aspect of this implementation, management logic 706 may create a website to enable the user to control management of the lifetime. In accordance with this aspect, the website may enable the user to consume the hybrid software application by triggering the provision and assign processes. In further accordance with this aspect, the website may enable the user to initiate updates and/or upgrades to new versions of the hybrid software application. In further accordance with this aspect, the website may enable the user to initiate deprovisioning of the hybrid software application in accordance with a definition of the deprovisioning process in the application manifest. It should be noted that the deprovisioning process may be automatically orchestrated by management logic 706 (e.g., in the case of a free trial of the hybrid software application) or may be triggered by the user otherwise based on a definition of the deprovisioning process in the application manifest 724.

In an example embodiment, executing the workflows and managing the lifetime of the hybrid software application at step 410 includes executing first and second workflows that are configured to implement respective first and second heterogeneous software products. In accordance with this embodiment, the first heterogeneous software product serves as a platform on which the second heterogeneous software product is implemented. In one example, the first heterogeneous software product may be generated by a service provider that models the lifetime of the hybrid software application. In another example, the second heterogeneous software product may be generated by an independent software vendor from which the workflows are received or by another independent software vendor.

In another example embodiment, executing the workflows and managing the lifetime of the hybrid software application at step 410 includes executing a first workflow that is configured to implement a first heterogeneous software product that is created by an independent software vendor from which the workflows are received. In accordance with this embodiment, executing the workflows and managing the lifetime of the hybrid software application at step 410 further includes executing a second workflow that is configured to implement a second heterogeneous software product that is created by a third-party independent software vendor that is not the independent software vendor from which the workflows are received and that is not a service provider that models the lifetime of the hybrid software application.

At step 412, the application manifest is validated (e.g., against accidental and/or malicious tampering) based at least in part on a determination that execution of the workflows provides a result that is specified by an independent software vendor from which the workflows are received. For example, a call may be made into the workflows to determine whether each process in the workflow was completed successfully. In accordance with this example, the application manifest may be validated based on each process in the workflows being completed successfully. In another example, correctness and/or robustness of the application manifest may be certified by running a synthetic test and/or a stress test with regard to the hybrid software application. A synthetic test is a test that utilizes virtual data and/or simulated users. A stress test is a test having parameters that are beyond the limit of normal operation.

In an example implementation, validation logic 708 validates the application manifest 724 based at least in part on a determination that execution of the workflows 712 provides a result that is specified by the independent software vendor. In accordance with this implementation, validation logic 708 may validate the application manifest 724 in response to receipt of the result indicator 728. For instance, validation logic 708 may validate the application manifest based at least in part on the result indicator 728 indicating that each process in the workflows 712 was completed successfully. In further accordance with this implementation, validation logic 708 may generate a validation indicator 732 in response to validating the application manifest 724. In further accordance with this implementation, the validation indicator 732 may indicate that the application manifest 724 is validated.

A file may be validated by signing the file with a private key of a certificate issued by a trusted certificate authority, and the signature may be validated using the corresponding public key. Some differences exist between validating a file and validating an application manifest (or verifying validity of the same). For example, the application manifest may not be a packaged file that the independent software vendor provides. In another example, the application manifest may be created and consumed in the context of a cloud computing program. Thus, it may be desirable to protect the hybrid software application from unauthorized or improper updates in that context. Accordingly, having the independent software vendor sign the application manifest may be counter to the intended goal of protecting the hybrid software application.

In an example embodiment, a cryptographic key (kid) is created for the application manifest in a secure environment. For example, the Kid may not be gettable in the secure location. In accordance with this example, no system outside the secure environment can access the Kid. When a version of the manifest is created or updated, a signature of the application manifest version (Sig) is created by calling Sign with the solution entity (as a byte array), the Kid, and the signing algorithm (e.g., RS512). The signature Sig is persisted as a secret and returned to the independent software vendor, which may persist the Sig offline to validate the application manifest later. Assuming that all updates to a secret are audited (and persisted), all updates to Sig may be automatically tracked (and persisted). The validity of the application manifest may be verified by calling Verify and passing in the Kid, the solution entity (as a byte stream), the Sig, and the signing algorithm.

In some example embodiments, one or more steps 402, 404, 406, 408, 410, and/or 412 of flowchart 400 may not be performed. Moreover, steps in addition to or in lieu of steps 402, 404, 406, 408, 410, and/or 412 may be performed. For instance, in an example embodiment, the method of flowchart 400 further includes receiving (e.g., from the independent software vendor) questions to be presented to the user. For instance, management logic 706 may receive questions 718 to be presented to the user. In accordance with this embodiment, the method of flowchart 400 further includes presenting the questions to the user based at least in part on receipt of the request. For instance, management logic 706 may present the questions 718 to the user based at least in part on receipt of the request 716. In further accordance with this embodiment, executing the workflows and managing the lifetime of the hybrid software application at step 410 includes executing the workflows and managing the lifetime of the hybrid software application further based at least in part on responses to the questions that are received from the user. For instance, management logic 706 may execute the workflows 712 and manage the lifetime of the hybrid software application further based at least in part on responses 720 to the questions 718 that are received from the user.

In an aspect of this embodiment, the request indicates a type of the user. In accordance with this aspect, presenting the questions to the user includes presenting the questions to the user based at least in part on an analysis of the application manifest with respect to the type of the user. In further accordance with this aspect, executing the workflows and managing the lifetime of the hybrid software application at step 410 includes executing the workflows and managing the lifetime of the hybrid software application based at least in part on the type of the user.

In another example embodiment, the method of flowchart 400 further includes receiving (e.g., from the independent software vendor) an indication of a number of users that the hybrid software application is capable of supporting. For instance, validation logic 708 may receive user information 730. In accordance with this example, the user information 730 may indicate the number of the users that the hybrid software application is capable of supporting. In accordance with this embodiment, validating the application manifest at step 412 includes validating the application manifest further by determining that the hybrid software application is capable of supporting the number of users in parallel. For example, validation logic 708 may validate the application manifest 710 based at least in part on the user information 730. In accordance with this example, validation logic 708 may validate the application manifest by determining that the hybrid software application is capable of supporting the number of users indicated by the user information 730.

For example, validation logic 708 may perform a stress test on the hybrid software application to determine a maximum number of users that the hybrid software application is capable of supporting in parallel. In accordance with this example, validation logic 708 may compare the maximum number to the number of users indicated by the independent software vendor. In further accordance with this example, validation logic 708 may validate the application manifest in response to (e.g., based at least in part on) the maximum number being greater than or equal to the number of users indicated by the independent software vendor. In further accordance with this example, validation logic 708 may not validate the application manifest in response to the maximum number being less than the number of users indicated by the independent software vendor.

In another example, validation logic 708 may execute the hybrid software application with respect to the number of users (e.g., synthetic users) indicated by the independent software vendor in parallel to determine whether the number of users utilizing the hybrid software application in parallel compromises performance of the hybrid software application. In accordance with this embodiment, validation logic 708 may validate the application manifest in response to the number of users utilizing the hybrid software application in parallel not compromising the performance of the hybrid software application. In further accordance with this embodiment, validation logic 708 may not validate the application manifest in response to the number of users utilizing the hybrid software application in parallel compromising the performance of the hybrid software application.

The number of users that the hybrid software application is capable of supporting is one example factor that may be taken into consideration to determine whether the application manifest is to be validated. Other example factors include but are not limited to a number of licenses that are received for the hybrid software application, limitation(s) of a platform on which the hybrid software application executes, capacity of hardware that is used to execute the hybrid software application, and quota(s) of the cloud service that hosts the hybrid software application.

In one example, the application manifest may be validated at step 412 based at least in part on a determination that a number of instances of the hybrid software application being used does not exceed a number of licenses that are received for the hybrid software application. In accordance with this example, the application manifest may not be validated based at least in part on a determination that a number of instances of the hybrid software application being used exceed a number of licenses that are received for the hybrid software application.

In another example, the application manifest may be validated at step 412 based at least in part on execution of the hybrid software application not exceeding one or more capabilities of a platform on which the hybrid software application executes. In accordance with this example, the application manifest may not be validated based at least in part on execution of the hybrid software application exceeding one or more capabilities of a platform on which the hybrid software application executes.

In yet another example, the application manifest may be validated at step 412 based at least in part on execution of the hybrid software application not exceeding capacity of hardware that is used to execute the hybrid software application. In accordance with this example, the application manifest may not be validated based at least in part on execution of the hybrid software application exceeding capacity of hardware that is used to execute the hybrid software application.

In still another example, the application manifest may be validated at step 412 based at least in part on execution of the hybrid software application not exceeding quota(s) of the cloud service that hosts the hybrid software application. In accordance with this example, the application manifest may not be validated based at least in part on execution of the hybrid software application exceeding quota(s) of the cloud service that hosts the hybrid software application.

Referring back to the provisioning-deprovisioning example mentioned above with reference to step 406, the heterogeneous software products may include at least a first heterogeneous software product and a second heterogeneous software product. In accordance with the provisioning-deprovisioning example, defining the provisioning process may include one or more of the steps shown in flowchart 500 of FIG. 5. As shown in FIG. 5, the method of flowchart 500 begins at step 502. In step 502, a first portion of the first subset of the operations that is configured to deploy the first heterogeneous software product is determined. At step 504, a second portion of the first subset of the operations that is configured to deploy the second heterogeneous software product is determined. At step 506, the provisioning process is defined to aggregate the first and second portions of the first subset of the operations. In an example, implementation, modeling logic 704 performs steps 502, 504, and 506.

In further accordance with the provisioning-deprovisioning example, defining the deprovisioning process may include one or more of the steps shown in flowchart 600 of FIG. 6. As shown in FIG. 6, the method of flowchart 600 begins at step 602. In step 602, a first portion of the second subset of the operations that is configured to terminate access of the user to the first heterogeneous software product is determined. At step 604, a second portion of the second subset of the operations that is configured to terminate access of the user to the second heterogeneous software product is determined. At step 606, the deprovisioning process is defined to aggregate the first and second portions of the second subset of the operations. In an example, implementation, modeling logic 704 performs steps 602, 604, and 606.

It will be recognized that computing system 700 may not include one or more of operation logic 702, modeling logic 704, management logic 706, validation logic 708, and/or hybrid application manifest logic 710. Furthermore, computing system 700 may include components in addition to or in lieu of operation logic 702, modeling logic 704, management logic 706, validation logic 708, and/or hybrid application manifest logic 710.

Any one or more of hybrid application manifest logic 110, operation logic 702, modeling logic 704, management logic 706, validation logic 708, hybrid application manifest logic 710, flowchart 400, flowchart 500, and/or flowchart 600 may be implemented in hardware, software, firmware, or any combination thereof For example, any one or more of hybrid application manifest logic 110, operation logic 702, modeling logic 704, management logic 706, validation logic 708, hybrid application manifest logic 710, flowchart 400, flowchart 500, and/or flowchart 600 may be implemented, at least in part, as computer program code configured to be executed in one or more processors.

In another example, any one or more of hybrid application manifest logic 110, operation logic 702, modeling logic 704, management logic 706, validation logic 708, hybrid application manifest logic 710, flowchart 400, flowchart 500, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In an example method of modeling a lifetime of a hybrid software application that includes heterogeneous software products using an application manifest, (a) workflows that are configured to implement the respective heterogeneous software products and (b) input-output information that specifies inputs of the heterogeneous software products and that further specifies a mapping between at least one output of at least one first heterogeneous software product and at least one input of at least one second heterogeneous software product are received. Operations that are to be performed to execute the workflows are determined based at least in part on the inputs and the mapping. The lifetime of the hybrid software application is modeled by generating an application manifest that defines at least a provisioning process and a deprovisioning process of the hybrid software application based at least in part on the operations to reduce an amount of resources that is consumed to configure the hybrid software application for execution. The defined provisioning process includes a first subset of the operations that is configured to deploy the hybrid software application. The deprovisioning process includes a second subset of the operations that is configured to terminate access of a user to the hybrid software application.

In a first aspect of the example method, the heterogeneous software products include at least a first heterogeneous software product and a second heterogeneous software product. In accordance with the first aspect, the example method further comprises determining a first portion of the first subset of the operations that is configured to deploy the first heterogeneous software product; determining a second portion of the first subset of the operations that is configured to deploy the second heterogeneous software product; defining the provisioning process to aggregate the first and second portions of the first subset of the operations; determining a first portion of the second subset of the operations that is configured to terminate access of the user to the first heterogeneous software product; determining a second portion of the second subset of the operations that is configured to terminate access of the user to the second heterogeneous software product; and defining the deprovisioning process to aggregate the first and second portions of the second subset of the operations.

In a second aspect of the example method, modeling the lifetime of the hybrid software application comprises modeling a plurality of versions of the lifetime that corresponds to a plurality of provision types. In accordance with the second aspect, the plurality of provision types comprises at least a test drive provision type and a production provision type. In further accordance with the second aspect, the test drive provision type is characterized by limiting execution of the hybrid software application to a predetermined environment and a predetermined period of time. In further accordance with the second aspect, the production provision type is characterized by limiting execution of the hybrid software application to neither the predetermined environment nor the predetermined period of time. The second aspect of the example method may be implemented in combination with the first aspect of the example method, though the example embodiments are not limited in this respect.

In an example of the second aspect, the plurality of provision types further comprises a trial provision type, which is characterized by enabling a user of the hybrid software application to select a limited environment in which to execute the hybrid software application and which does not limit execution of the hybrid software application to a predetermined period of time.

In a third aspect of the example method, the application manifest further defines an assign process. In accordance with the third aspect, the defined assign process includes a third subset of the operations that is configured to assign the user to the hybrid software application. The third aspect of the example method may be implemented in combination with the first and/or second aspect of the example method, though the example embodiments are not limited in this respect.

In a fourth aspect of the example method, the application manifest further defines an update process. In accordance with the third aspect, the defined update process includes a third subset of the operations that is configured to change a deployed version of the hybrid software application from a first version having first metadata to a second version having second metadata that is different from the first metadata. The fourth aspect of the example method may be implemented in combination with the first, second, and/or third aspect of the example method, though the example embodiments are not limited in this respect.

In a fifth aspect of the example method, the application manifest further defines an upgrade process. In accordance with the fifth aspect, the defined upgrade process includes a third subset of the operations that is configured to change a deployed version of the hybrid software application to include one or more additional capabilities. The fifth aspect of the example method may be implemented in combination with the first, second, third, and/or fourth aspect of the example method, though the example embodiments are not limited in this respect.

In a sixth aspect of the example method, modeling the lifetime further comprises defining a predetermined fixed amount of time that is to pass between a first time instance at which the provisioning process is initiated and a second time instance at which the deprovisioning process is initiated. The sixth aspect of the example method may be implemented in combination with the first, second, third, fourth, and/or fifth aspect of the example method, though the example embodiments are not limited in this respect.

In a seventh aspect of the example method, the example method further comprises receiving a request from the user to access the hybrid software application. In accordance with the seventh aspect, the example method further comprises executing the workflows and managing the lifetime of the hybrid software application based at least in part on the application manifest in response to receipt of the request. The seventh aspect of the example method may be implemented in combination with the first, second, third, fourth, fifth, and/or sixth aspect of the example method, though the example embodiments are not limited in this respect.

In a first example of the seventh aspect, the example method further comprises receiving questions to be presented to the user. In accordance with this example, the example method further comprises presenting the questions to the user based at least in part on receipt of the request. In further accordance with this example, executing the workflows and managing the lifetime of the hybrid software application comprises executing the workflows and managing the lifetime of the hybrid software application further based at least in part on responses to the questions that are received from the user.

In an implementation of the first example of the seventh aspect, the request indicates a type of the user. In accordance with this implementation, presenting the questions to the user comprises presenting the questions to the user based at least in part on an analysis of the application manifest with respect to the type of the user. In further accordance with this implementation, executing the workflows and managing the lifetime of the hybrid software application comprises executing the workflows and managing the lifetime of the hybrid software application based at least in part on the type of the user.

In a second example of the seventh aspect, executing the workflows and managing the lifetime of the hybrid software application comprises executing first and second workflows that are configured to implement respective first and second heterogeneous software products. In accordance with this example, the first heterogeneous software product serves as a platform on which the second heterogeneous software product is implemented.

In a third example of the seventh aspect, executing the workflows and managing the lifetime of the hybrid software application comprises executing a first workflow that is configured to implement a first heterogeneous software product that is created by an independent software vendor from which the workflows are received. In accordance with the third example, executing the workflows and managing the lifetime of the hybrid software application further comprises executing a second workflow that is configured to implement a second heterogeneous software product that is created by a third-party independent software vendor that is not the independent software vendor from which the workflows are received and that is not a service provider that models the lifetime of the hybrid software application.

In an eighth aspect of the example method, the example method further comprises validating the application manifest based at least in part on a determination that execution of the workflows provides a result that is specified by an independent software vendor from which the workflows are received. The eighth aspect of the example method may be implemented in combination with the first, second, third, fourth, fifth, sixth, and/or seventh aspect of the example method, though the example embodiments are not limited in this respect.

In an example of the eighth aspect, the example method further comprises receiving an indication of a number of users that the hybrid software application is capable of supporting. In accordance with this example, validating the application manifest comprises validating the application manifest further by determining that the hybrid software application is capable of supporting the number of users in parallel.

In a ninth aspect of the example method, modeling the lifetime of the hybrid software application comprises automatically modeling the lifetime of the hybrid software application by automatically generating the application manifest based at least in part on the operations.

An example system to model a lifetime of a hybrid software application that includes heterogeneous software products using an application manifest comprises memory and one or more processors coupled to the memory. The one or more processors are configured to receive (a) workflows that are configured to implement the respective heterogeneous software products and (b) input-output information that specifies inputs of the heterogeneous software products and that further specifies a mapping between at least one output of at least one first heterogeneous software product and at least one input of at least one second heterogeneous software product. The one or more processors are further configured to determine operations that are to be performed to execute the workflows based at least in part on the inputs and the mapping. The one or more processors are further configured to model the lifetime of the hybrid software application by generating an application manifest that defines at least a provisioning process and a deprovisioning process of the hybrid software application based at least in part on the operations to reduce an amount of resources that is consumed to configure the hybrid software application for execution. The defined provisioning process includes a first subset of the operations that is configured to deploy the hybrid software application. The defined deprovisioning process includes a second subset of the operations that is configured to terminate access of a user to the hybrid software application.

In a first aspect of the example system, the heterogeneous software products include at least a first heterogeneous software product and a second heterogeneous software product. In accordance with the first aspect, the one or more processors are configured to determine a first portion of the first subset of the operations that is configured to deploy the first heterogeneous software product; determine a second portion of the first subset of the operations that is configured to deploy the second heterogeneous software product; define the provisioning process to aggregate the first and second portions of the first subset of the operations; determine a first portion of the second subset of the operations that is configured to terminate access of the user to the first heterogeneous software product; determine a second portion of the second subset of the operations that is configured to terminate access of the user to the second heterogeneous software product; and define the deprovisioning process to aggregate the first and second portions of the second subset of the operations.

In a second aspect of the example system, the one or more processors are configured to model a plurality of versions of the lifetime that corresponds to a plurality of provision types, the plurality of provision types comprising at least a test drive provision type and a production provision type. In accordance with the second aspect, the test drive provision type is characterized by limiting execution of the hybrid software application to a predetermined environment and a predetermined period of time. In further accordance with the second aspect, the production provision type is characterized by limiting execution of the hybrid software application to neither the predetermined environment nor the predetermined period of time. The second aspect of the example system may be implemented in combination with the first aspect of the example system, though the example embodiments are not limited in this respect.

In an example of the second aspect, the plurality of provision types further comprises a trial provision type, which is characterized by enabling a user of the hybrid software application to select a limited environment in which to execute the hybrid software application and which does not limit execution of the hybrid software application to a predetermined period of time.

In a third aspect of the example system, the application manifest further defines an assign process. In accordance with the third aspect, the defined assign process includes a third subset of the operations that is configured to assign the user to the hybrid software application. The third aspect of the example system may be implemented in combination with the first and/or second aspect of the example system, though the example embodiments are not limited in this respect.

In a fourth aspect of the example system, the application manifest further defines an update process. In accordance with the fourth aspect, the defined update process includes a third subset of the operations that is configured to change a deployed version of the hybrid software application from a first version having first metadata to a second version having second metadata that is different from the first metadata. The fourth aspect of the example system may be implemented in combination with the first, second, and/or third aspect of the example system, though the example embodiments are not limited in this respect.

In a fifth aspect of the example system, the application manifest further defines an upgrade process. In accordance with the fifth aspect, the defined upgrade process includes a third subset of the operations that is configured to change a deployed version of the hybrid software application to include one or more additional capabilities. The fifth aspect of the example system may be implemented in combination with the first, second, third, and/or fourth aspect of the example system, though the example embodiments are not limited in this respect.

In a sixth aspect of the example system, the one or more processors are configured to define a predetermined fixed amount of time that is to pass between a first time instance at which the provisioning process is initiated and a second time instance at which the deprovisioning process is initiated. The sixth aspect of the example system may be implemented in combination with the first, second, third, fourth, and/or fifth aspect of the example system, though the example embodiments are not limited in this respect.

In a seventh aspect of the example system, the one or more processors are further configured to execute the workflows and manage the lifetime of the hybrid software application based at least in part on the application manifest in response to receipt of a request from the user to access the hybrid software application. The seventh aspect of the example system may be implemented in combination with the first, second, third, fourth, fifth, and/or sixth aspect of the example system, though the example embodiments are not limited in this respect.

In a first example of the seventh aspect, the one or more processors are configured to receive questions to be presented to the user. In accordance with the first example, the one or more processors are configured to present the questions to the user based at least in part on receipt of the request. In further accordance with the first example, the one or more processors are configured to execute the workflows and manage the lifetime of the hybrid software application further based at least in part on responses to the questions that are received from the user.

In an implementation of the first example of the seventh aspect, the request indicates a type of the user. In accordance with this implementation, the one or more processors are configured to present the questions to the user based at least in part on an analysis of the application manifest with respect to the type of the user. In further accordance with this implementation, the one or more processors are configured to execute the workflows and manage the lifetime of the hybrid software application based at least in part on the type of the user.

In a second example of the seventh aspect, the one or more processors are configured to execute first and second workflows that are configured to implement respective first and second heterogeneous software products. In accordance with the second example, the first heterogeneous software product serves as a platform on which the second heterogeneous software product is implemented.

In a third example of the seventh aspect, the one or more processors are configured to execute a first workflow that is configured to implement a first heterogeneous software product that is created by an independent software vendor from which the workflows are received. In accordance with the third example, the one or more processors are configured to execute a second workflow that is configured to implement a second heterogeneous software product that is created by a third-party independent software vendor that is not the independent software vendor from which the workflows are received and that is not a service provider that models the lifetime of the hybrid software application.

In an eighth aspect of the example system, the one or more processors are further configured to validate the application manifest based at least in part on a determination that execution of the workflows provides a result that is specified by an independent software vendor from which the workflows are received. The eighth aspect of the example system may be implemented in combination with the first, second, third, fourth, fifth, sixth, and/or seventh aspect of the example system, though the example embodiments are not limited in this respect.

In an example of the eighth aspect, the one or more processors are configured to receive an indication of a number of users that the hybrid software application is capable of supporting. In accordance with this example, the one or more processors are configured to validate the application manifest further by determining that the hybrid software application is capable of supporting the number of users in parallel.

In a ninth aspect of the example system, the one or more processors are configured to automatically model the lifetime of the hybrid software application by automatically generating the application manifest based at least in part on the operations.

An example computer program product comprises a computer-readable storage medium having instructions recorded thereon for enabling a processor-based system to perform operations to model a lifetime of a hybrid software application that includes heterogeneous software products using an application manifest. The operations comprise receive (a) workflows that are configured to implement the respective heterogeneous software products and (b) input-output information that specifies inputs of the heterogeneous software products and that further specifies a mapping between at least one output of at least one first heterogeneous software product and at least one input of at least one second heterogeneous software product. The operations further comprise determine operations that are to be performed to execute the workflows based at least in part on the inputs and the mapping. The operations further comprise model the lifetime of the hybrid software application by generating an application manifest that defines at least a provisioning process and a deprovisioning process of the hybrid software application based at least in part on the operations to reduce an amount of resources that is consumed to configure the hybrid software application for execution. The defined provisioning process includes a first subset of the operations that is configured to deploy the hybrid software application. The deprovisioning process includes a second subset of the operations that is configured to terminate access of a user to the hybrid software application.

IV. Example Computer System

Figure 8:
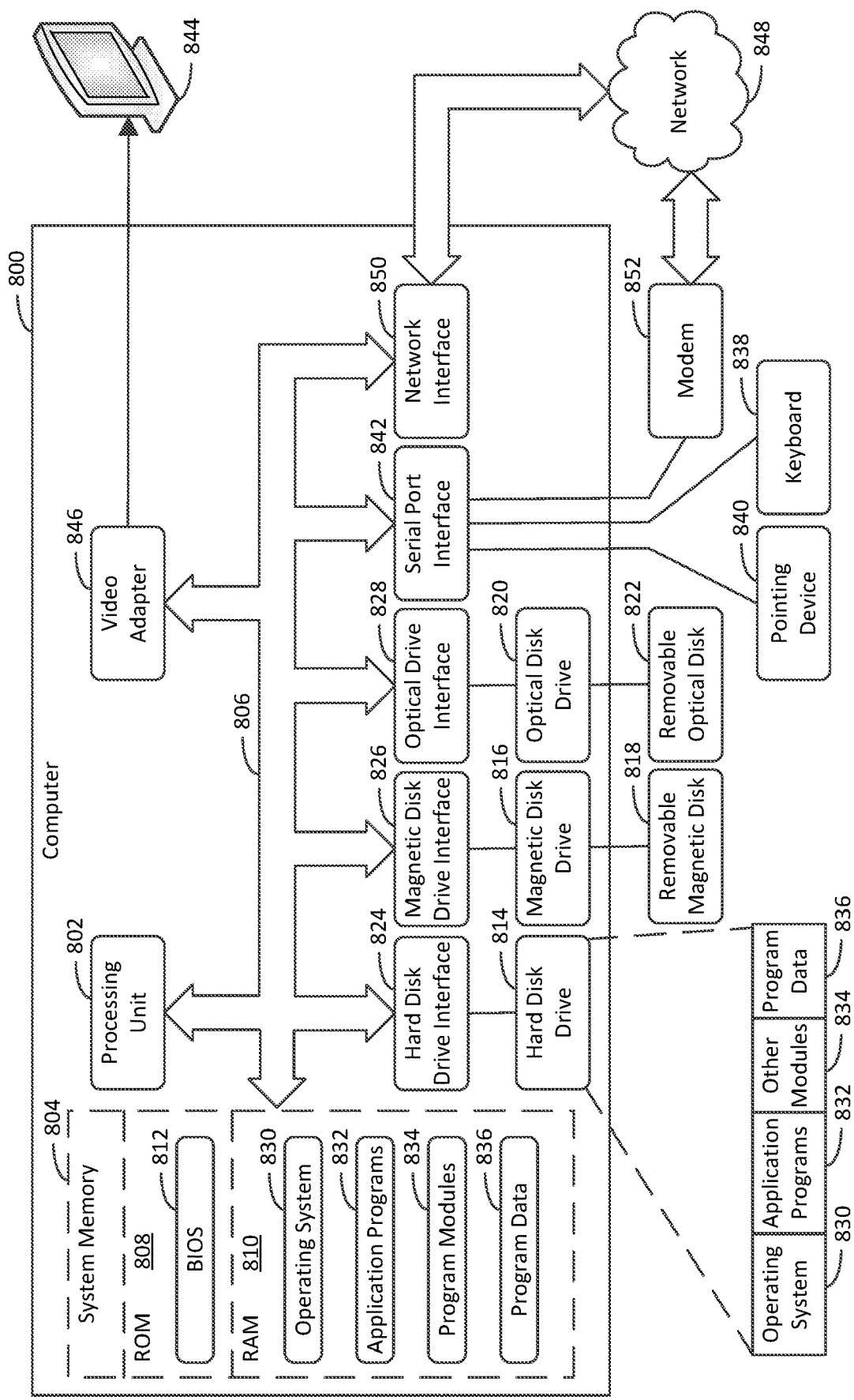
FIG. 8 depicts an example computer in which embodiments may be implemented.

FIG. 8 depicts an example computer 800 in which embodiments may be implemented. Any one or more of client devices 102A-102M, any one or more of machines 106A-106N, and/or hybrid application manifest logic 110 shown in FIG. 1; and/or computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of hybrid application manifest logic 110, operation logic 702, modeling logic 704, management logic 706, validation logic 708, hybrid application manifest logic 710, flowchart 400 (including any step of flowchart 400), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to model a lifetime of a hybrid software application that includes heterogeneous software products using an application manifest, the system comprising:
   memory; and
   one or more processors coupled to the memory, the one or more processors configured to:
      receive (a) workflows that are configured to implement the respective heterogeneous software products and (b) input-output information that specifies inputs of the heterogeneous software products and that further specifies a mapping between at least one output of at least one first heterogeneous software product and at least one input of at least one second heterogeneous software product;
      determine operations that are to be performed to execute the workflows based at least in part on the inputs and the mapping; and
      model the lifetime of the hybrid software application by generating an application manifest that defines the lifetime based at least in part on the operations to reduce an amount of resources that is consumed to configure the hybrid software application for execution.

2. The system of claim 1, wherein the one or more processors are configured to model the lifetime of the hybrid software application by generating the application manifest that defines at least a provisioning process of the hybrid software application based at least in part on the operations to reduce the amount of resources that is consumed to configure the hybrid software application for execution; and
   wherein the defined provisioning process includes a subset of the operations that is configured to deploy the hybrid software application.

3. The system of claim 2, wherein the heterogeneous software products include at least a first heterogeneous software product and a second heterogeneous software product; and
   wherein the one or more processors are configured to:
      determine a first portion of the subset of the operations that is configured to deploy the first heterogeneous software product;
      determine a second portion of the subset of the operations that is configured to deploy the second heterogeneous software product; and
      define the provisioning process to aggregate the first and second portions of the subset of the operations.

4. The system of claim 1, wherein the one or more processors are configured to model the lifetime of the hybrid software application by generating the application manifest that defines at least a deprovisioning process of the hybrid software application based at least in part on the operations to reduce the amount of resources that is consumed to configure the hybrid software application for execution; and
   wherein the defined deprovisioning process includes a subset of the operations that is configured to terminate access of a user to the hybrid software application.

5. The system of claim 4, wherein the heterogeneous software products include at least a first heterogeneous software product and a second heterogeneous software product; and
   wherein the one or more processors are configured to:
      determine a first portion of the subset of the operations that is configured to terminate access of the user to the first heterogeneous software product;
      determine a second portion of the subset of the operations that is configured to terminate access of the user to the second heterogeneous software product; and
      define the deprovisioning process to aggregate the first and second portions of the subset of the operations.

6. The system of claim 1, wherein the one or more processors are configured to:
   model a plurality of versions of the lifetime that corresponds to a plurality of provision types, the plurality of provision types comprising at least a test drive provision type and a production provision type, the test drive provision type characterized by limiting execution of the hybrid software application to a predetermined environment and a predetermined period of time, the production provision type characterized by limiting execution of the hybrid software application to neither the predetermined environment nor the predetermined period of time.

7. The system of claim 6, wherein the plurality of provision types further comprises a trial provision type, which is characterized by enabling a user of the hybrid software application to select a limited environment in which to execute the hybrid software application and which does not limit execution of the hybrid software application to a predetermined period of time.

8. The system of claim 1, wherein the one or more processors are configured to model the lifetime of the hybrid software application by generating the application manifest that defines at least an assign process of the hybrid software application based at least in part on the operations to reduce the amount of resources that is consumed to configure the hybrid software application for execution; and wherein the defined assign process includes a subset of the operations that is configured to assign the user to the hybrid software application.

9. The system of claim 1, wherein the one or more processors are configured to model the lifetime of the hybrid software application by generating the application manifest that defines at least an update process of the hybrid software application based at least in part on the operations to reduce the amount of resources that is consumed to configure the hybrid software application for execution; and wherein the defined update process includes a subset of the operations that is configured to change a deployed version of the hybrid software application from a first version having first metadata to a second version having second metadata that is different from the first metadata.

10. The system of claim 1, wherein the one or more processors are configured to model the lifetime of the hybrid software application by generating the application manifest that defines at least an upgrade process of the hybrid software application based at least in part on the operations to reduce the amount of resources that is consumed to configure the hybrid software application for execution; and wherein the defined upgrade process includes a subset of the operations that is configured to change a deployed version of the hybrid software application to include one or more additional capabilities.

11. A method of modeling a lifetime of a hybrid software application that includes heterogeneous software products using an application manifest, the method comprising:

receiving (a) workflows that are configured to implement the respective heterogeneous software products and (b) input-output information that specifies inputs of the heterogeneous software products and that further specifies a mapping between at least one output of at least one first heterogeneous software product and at least one input of at least one second heterogeneous software product;

determining operations that are to be performed to execute the workflows based at least in part on the inputs and the mapping; and modeling, using at least one processor, the lifetime of the hybrid software application by generating an application manifest that defines the lifetime based at least in part on the operations to reduce an amount of resources that is consumed to configure the hybrid software application for execution.

12. The method of claim 11, wherein modeling the lifetime of the hybrid software application comprises:

modeling the lifetime of the hybrid software application by generating the application manifest that defines at least a provisioning process of the hybrid software application based at least in part on the operations to reduce the amount of resources that is consumed to configure the hybrid software application for execution; and wherein the defined provisioning process includes a subset of the operations that is configured to deploy the hybrid software application.

13. The method of claim 12, wherein the heterogeneous software products include at least a first heterogeneous software product and a second heterogeneous software product; and wherein the method further comprises:
determining a first portion of the subset of the operations that is configured to deploy the first heterogeneous software product;
determining a second portion of the subset of the operations that is configured to deploy the second heterogeneous software product; and
defining the provisioning process to aggregate the first and second portions of the subset of the operations.

14. The method of claim 11, wherein modeling the lifetime of the hybrid software application comprises:

modeling the lifetime of the hybrid software application by generating the application manifest that defines at least a deprovisioning process of the hybrid software application based at least in part on the operations to reduce the amount of resources that is consumed to configure the hybrid software application for execution; and wherein the defined deprovisioning process includes a subset of the operations that is configured to terminate access of a user to the hybrid software application.

15. The method of claim 14, wherein the heterogeneous software products include at least a first heterogeneous software product and a second heterogeneous software product;

wherein the method further comprises:
determining a first portion of the subset of the operations that is configured to terminate access of the user to the first heterogeneous software product;
determining a second portion of the subset of the operations that is configured to terminate access of the user to the second heterogeneous software product; and
defining the deprovisioning process to aggregate the first and second portions of the subset of the operations.

16. The method of claim 11, wherein modeling the lifetime of the hybrid software application comprises:

modeling the lifetime of the hybrid software application by generating the application manifest that defines at least an assign process of the hybrid software application based at least in part on the operations to reduce the amount of resources that is consumed to configure the hybrid software application for execution; and wherein the defined assign process includes a subset of the operations that is configured to assign the user to the hybrid software application.

17. The method of claim 11, wherein modeling the lifetime of the hybrid software application comprises:

modeling the lifetime of the hybrid software application by generating the application manifest that defines at least an update process of the hybrid software application based at least in part on the operations to reduce the amount of resources that is consumed to configure the hybrid software application for execution; and wherein the defined update process includes a subset of the operations that is configured to change a deployed version of the hybrid software application from a first version having first metadata to a second version having second metadata that is different from the first metadata.

18. The method of claim 11, wherein modeling the lifetime of the hybrid software application comprises:

modeling the lifetime of the hybrid software application by generating the application manifest that defines at least an upgrade process of the hybrid software application based at least in part on the operations to reduce the amount of resources that is consumed to configure the hybrid software application for execution; and wherein the defined upgrade process includes a subset of the operations that is configured to change a deployed version of the hybrid software application to include one or more additional capabilities.

19. The method of claim 11, wherein modeling the lifetime of the hybrid software application comprises:

automatically modeling the lifetime of the hybrid software application by automatically generating the application manifest based at least in part on the operations.

20. A computer program product comprising a computer-readable device having instructions recorded thereon for enabling a processor-based system to perform operations to model a lifetime of a hybrid software application that includes heterogeneous software products using an application manifest, the operations comprising:

receive (a) workflows that are configured to implement the respective heterogeneous software products and (b) input-output information that specifies inputs of the heterogeneous software products and that further specifies a mapping between at least one output of at least one first heterogeneous software product and at least one input of at least one second heterogeneous software product;

determine operations that are to be performed to execute the workflows based at least in part on the inputs and the mapping; and model the lifetime of the hybrid software application by generating an application manifest that defines the lifetime based at least in part on the operations to reduce an amount of resources that is consumed to configure the hybrid software application for execution.

* * * * *